United States Patent
Lutz et al.

(10) Patent No.: US 9,642,343 B2
(45) Date of Patent: May 9, 2017

(54) DOUBLE HOUSING AQUARIUM

(71) Applicant: Elive LLC, New Berlin, WI (US)

(72) Inventors: Thomas Lutz, Cedar Rapids, IA (US); Matthew Allen, Waterford, WI (US)

(73) Assignee: ELIVE LLC, New Berlin, WI (US)

( * ) Notice: Subject to any disclaimer, the term of this patent is extended or adjusted under 35 U.S.C. 154(b) by 64 days.

(21) Appl. No.: 14/640,848

(22) Filed: Mar. 6, 2015

(65) Prior Publication Data
US 2015/0250150 A1 Sep. 10, 2015

Related U.S. Application Data

(60) Provisional application No. 61/949,397, filed on Mar. 7, 2014.

(51) Int. Cl.
*A01K 63/00* (2006.01)
*A01K 63/06* (2006.01)

(52) U.S. Cl.
CPC ............ *A01K 63/06* (2013.01); *A01K 63/003* (2013.01)

(58) Field of Classification Search
CPC ...................................................... A01K 63/06
USPC ........................................ 119/251, 248, 246
See application file for complete search history.

(56) References Cited

U.S. PATENT DOCUMENTS

| | | | |
|---|---|---|---|
| 910,905 A * | 1/1909 | Clements | A01G 27/04 119/248 |
| 2,981,228 A * | 4/1961 | Giuseppe Brandano | A01K 63/003 119/214 |
| 3,921,584 A * | 11/1975 | Scantlin | A01K 63/04 119/249 |
| 4,156,401 A * | 5/1979 | Ogui | A01K 63/003 119/259 |
| 4,528,940 A * | 7/1985 | Litzburg | A01K 63/003 119/248 |
| 4,531,477 A * | 7/1985 | Crossman | A01K 63/003 119/245 |
| 4,958,593 A * | 9/1990 | Hurlburt | A01K 63/003 119/246 |
| 5,317,991 A * | 6/1994 | Lee | A01K 63/003 119/249 |
| 5,957,085 A * | 9/1999 | Youngstrom | A01K 63/003 119/246 |
| 6,397,780 B1 * | 6/2002 | Youngstrom | A01K 63/003 119/246 |
| 6,520,117 B1 * | 2/2003 | Wood | A01K 63/003 119/246 |
| 7,073,463 B1 * | 7/2006 | Blakely | A01K 63/006 119/246 |
| 7,100,535 B2 * | 9/2006 | Cattin | A01K 63/003 119/224 |

(Continued)

*Primary Examiner* — Kristen C Hayes
(74) *Attorney, Agent, or Firm* — Michael Best & Friedrich LLP (57) ABSTRACT

An aquarium includes an outer housing including a bottom wall and a side wall extending from the bottom wall, the outer housing defining a first interior tank volume to house water. The aquarium also includes a base disposed inside the first interior volume and coupled to the bottom wall, the base including an aperture. The aquarium also includes an inner housing coupled to the base, the inner housing defining a second interior tank volume to house water, wherein the aperture provides fluid communication between the first and second interior tank volumes.

20 Claims, 15 Drawing Sheets

(56) References Cited

U.S. PATENT DOCUMENTS

2008/0011237 A1\* 1/2008 Tien ................ A01K 63/003
 119/248
2012/0042832 A1\* 2/2012 Trisel ............... A01K 63/006
 119/248

\* cited by examiner

FIG. 21

DOUBLE HOUSING AQUARIUM

CROSS-REFERENCE TO RELATED APPLICATIONS

This application claims priority to U.S. Provisional Application No. 61/949,397, filed Mar. 7, 2014, the entire contents of which is incorporated herein by reference.

FIELD OF THE INVENTION

The present invention relates to aquariums, and in particular to housing components of aquariums.

BACKGROUND OF THE INVENTION

Aquariums typically include either a generally round or rectangular-shaped transparent housing made of glass or other suitable material that houses an interior volume of water, as well as one or more aquatic animals, plants, and décor disposed within the interior volume. Aquariums are also often illuminated by a lighting system that provides illumination of water, fish, and/or the other elements disposed within the aquarium.

SUMMARY

In accordance with one construction, an aquarium includes an outer housing including a bottom wall and a side wall extending from the bottom wall, the outer housing defining a first interior tank volume to house water. The aquarium also includes a base disposed inside the first interior volume and coupled to the bottom wall, the base including an aperture. The aquarium also includes an inner housing coupled to the base, the inner housing defining a second interior tank volume to house water, wherein the aperture provides fluid communication between the first and second interior tank volumes.

In accordance with another construction, an aquarium includes an outer housing defining a tank volume to house water. The aquarium also includes an inner housing disposed within the outer housing and dividing the tank volume into an inner volume and an outer volume, the outer volume disposed between the outer housing and the inner housing. The aquarium also includes a filter coupled to the outer housing, the filter operable to filter all of the water within both the inner volume and the outer volume.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIGS. 1-21 illustrate an aquarium 10 for housing water and one or more aquatic animals, plants, coral, and/or décor. The aquarium 10 includes an outer housing 14 that has a bottom wall 18 (e.g., circular in shape in FIG. 2 or rectangular in FIG. 9) that rests on a supporting surface (e.g., a floor, desk, or counter) and a side wall or walls 22 that extend from the bottom wall 18 and terminate at a rim 26. Other constructions include different shapes for the outer housing 14 than that shown.

With reference to FIGS. 1, 3, 8, 10, 15, and 17, the outer housing 14 defines a first interior volume 30 of the aquarium 10, and is transparent (e.g., made of glass or plastic) to permit viewing of water, aquatic animals, plants, coral, and/or décor within the interior volume 30, although in some constructions one or more areas of the outer housing 14 are opaque.

Figure 1:
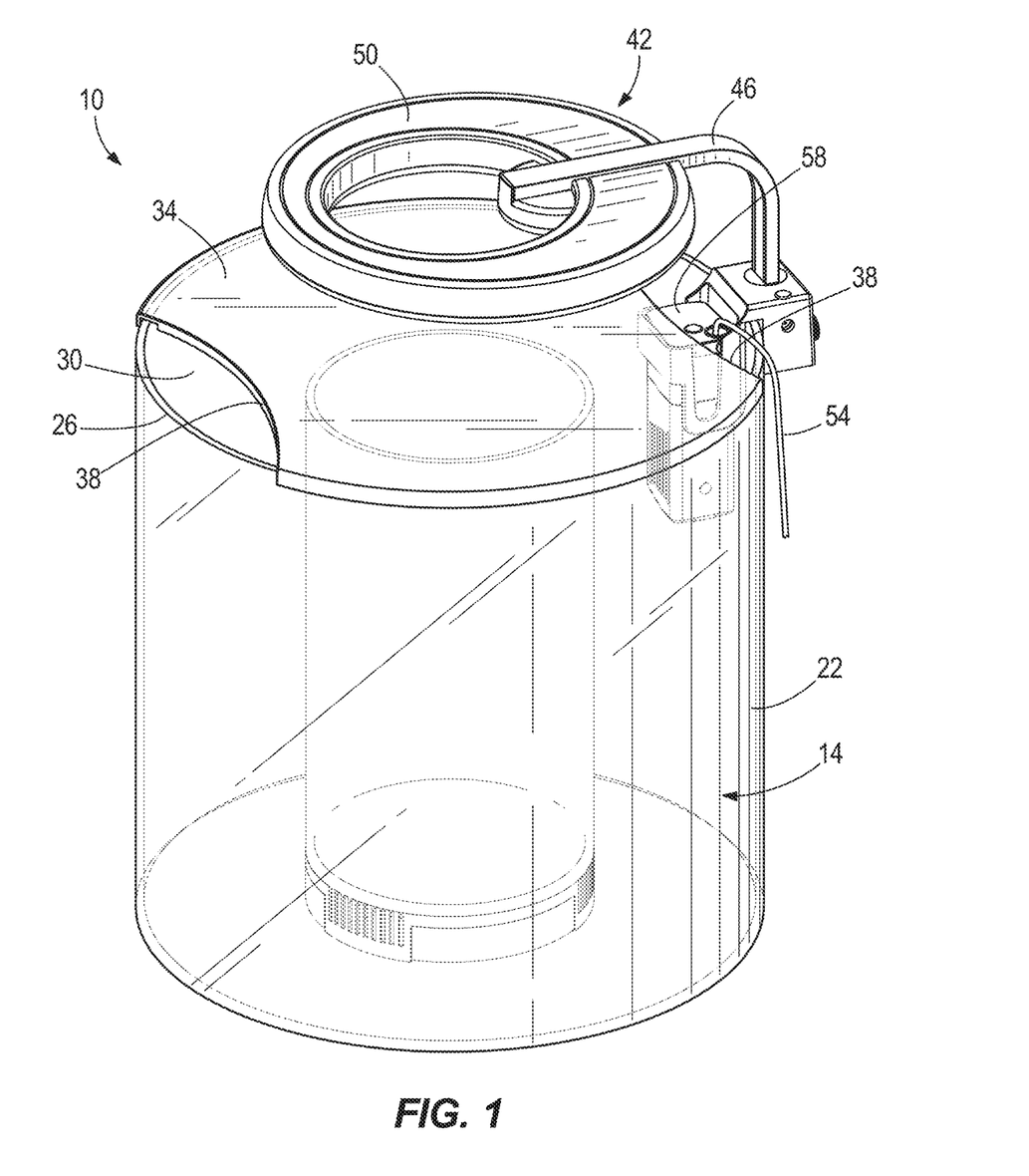
FIG. 1 is a top perspective view of an aquarium according to one construction.
Figure 2:
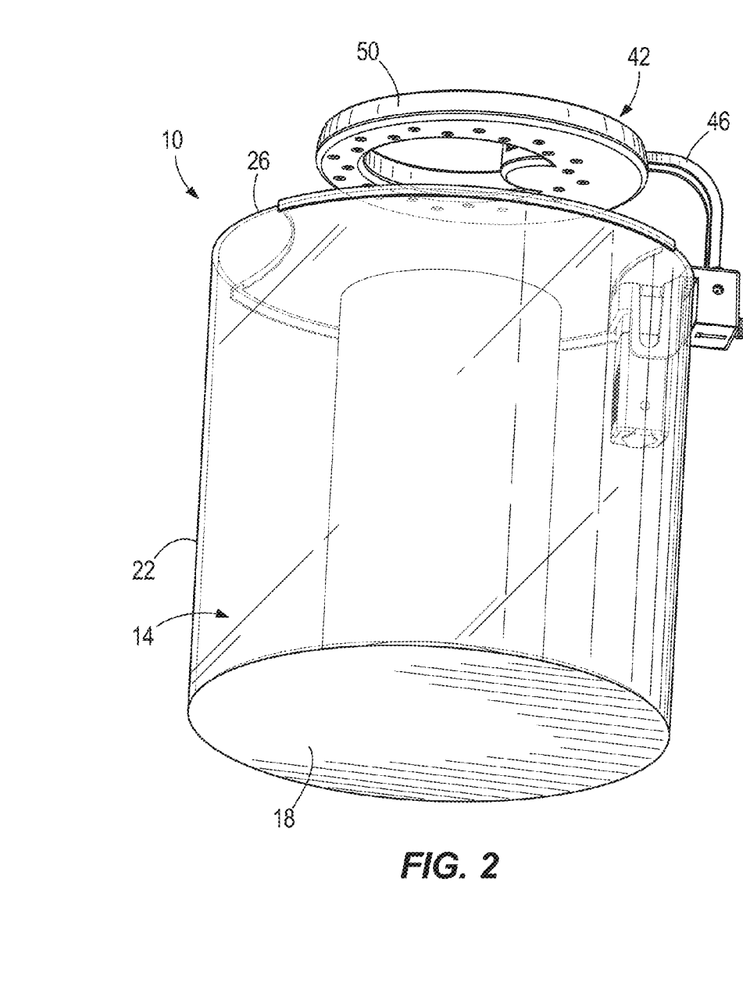
FIG. 2 is a bottom perspective view of the aquarium.
Figure 3:
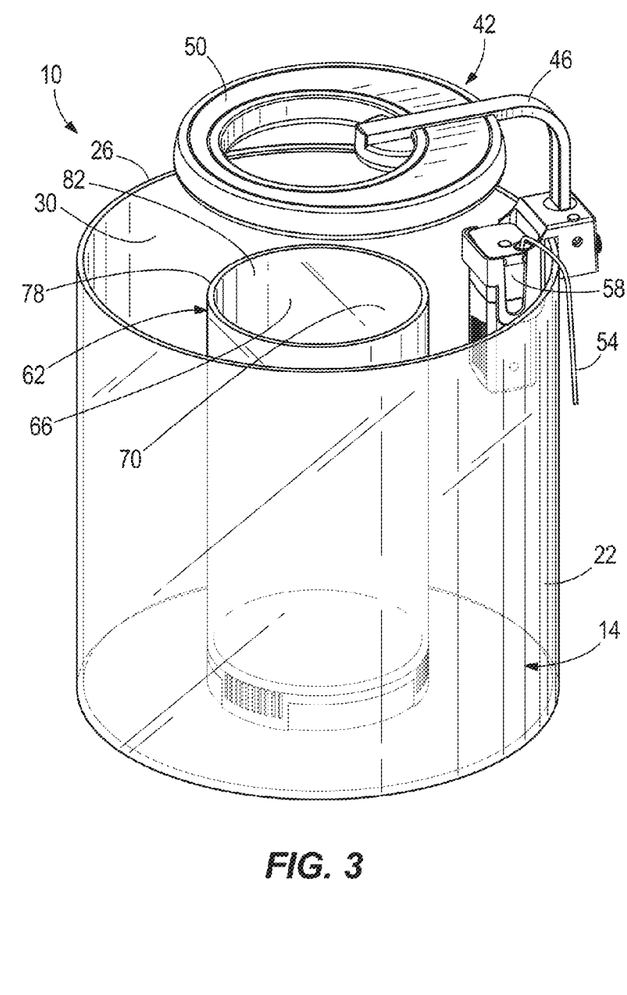
FIG. 3 is a perspective view of the aquarium, with a top panel removed.
Figure 8:
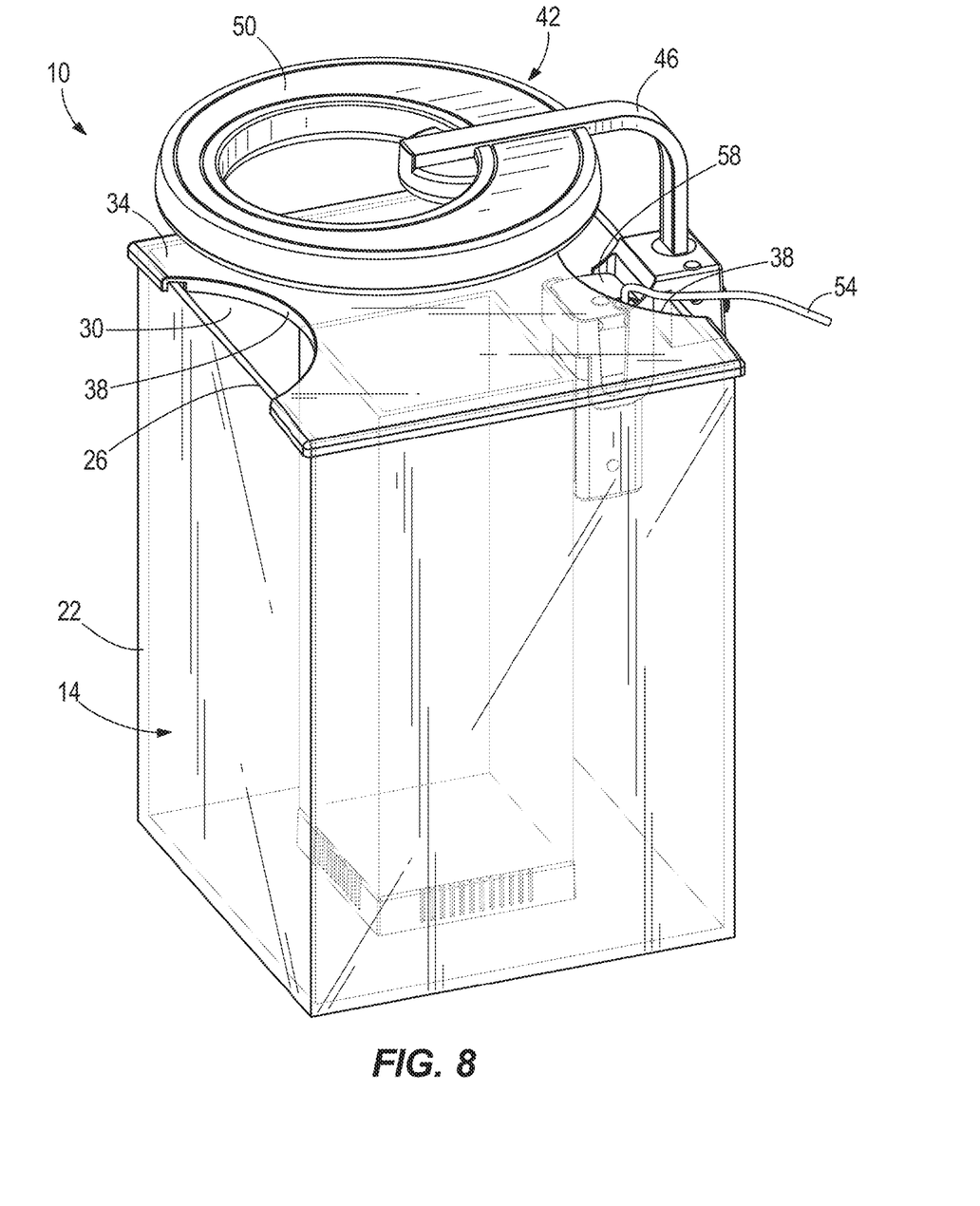
FIG. 8 is a top perspective view of an aquarium according to another construction.
Figure 9:
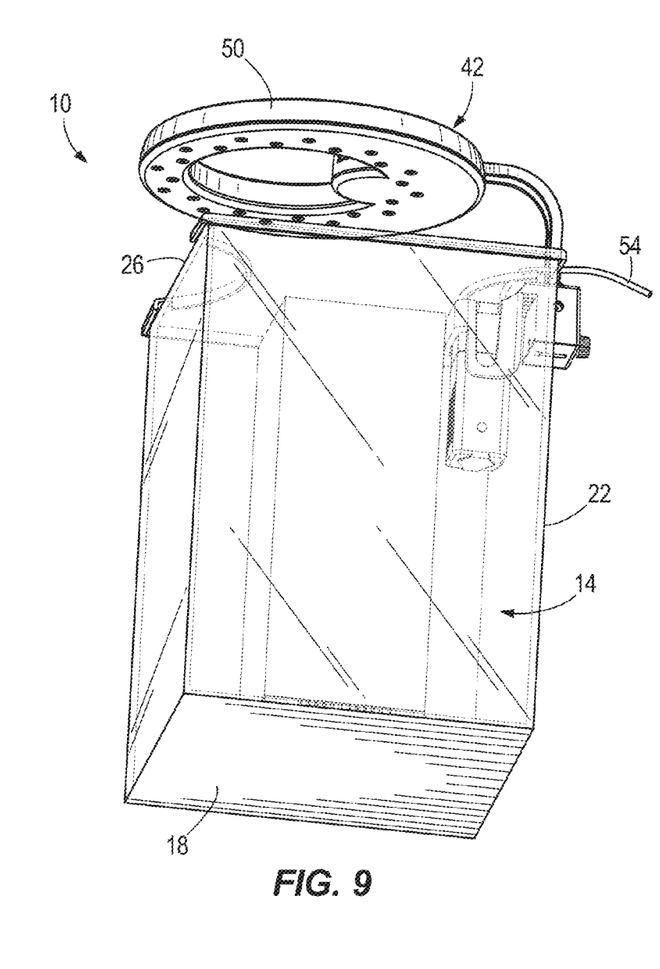
FIG. 9 is a bottom perspective view of the aquarium of FIG. 8.
Figure 15:
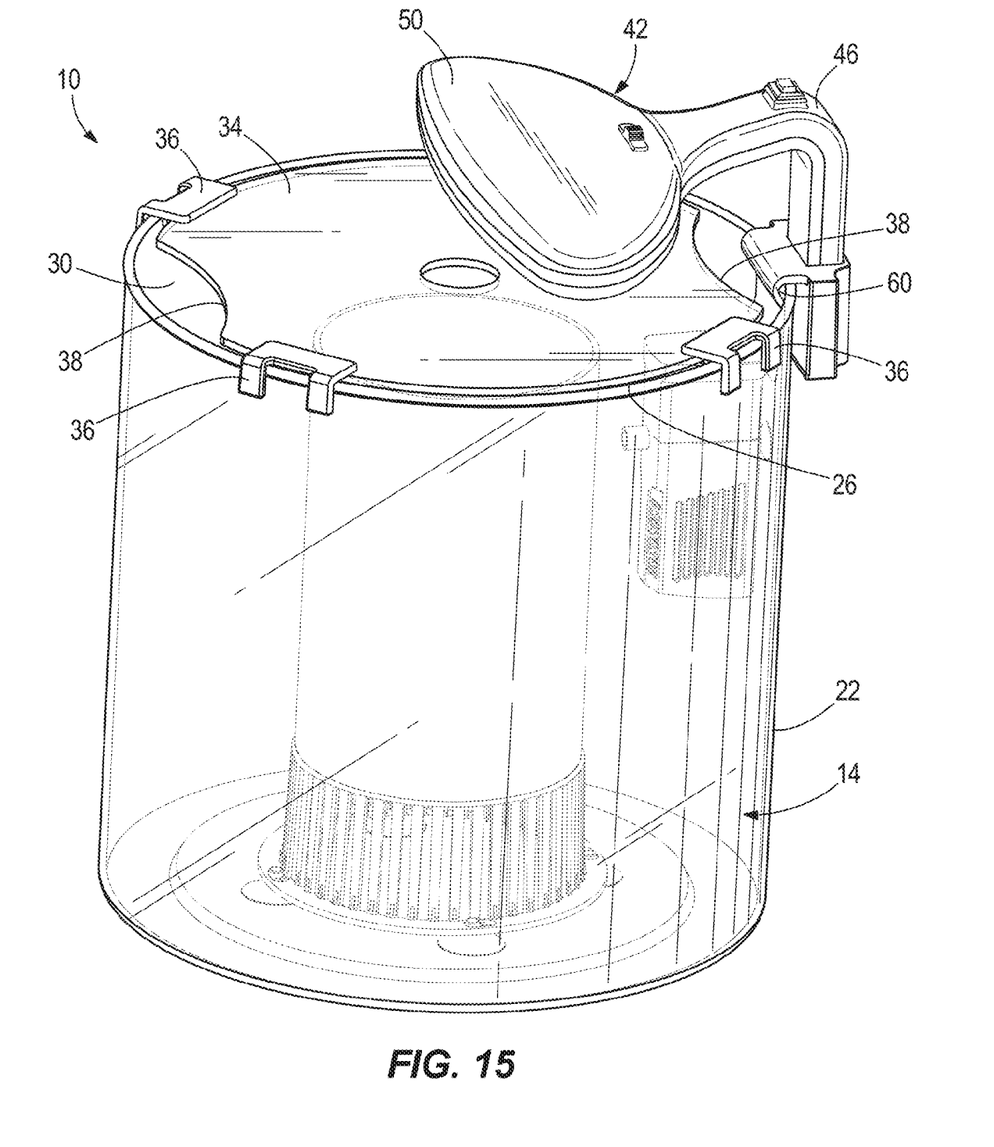
FIG. 15 is a top perspective view of an aquarium according to another construction.
Figure 16:
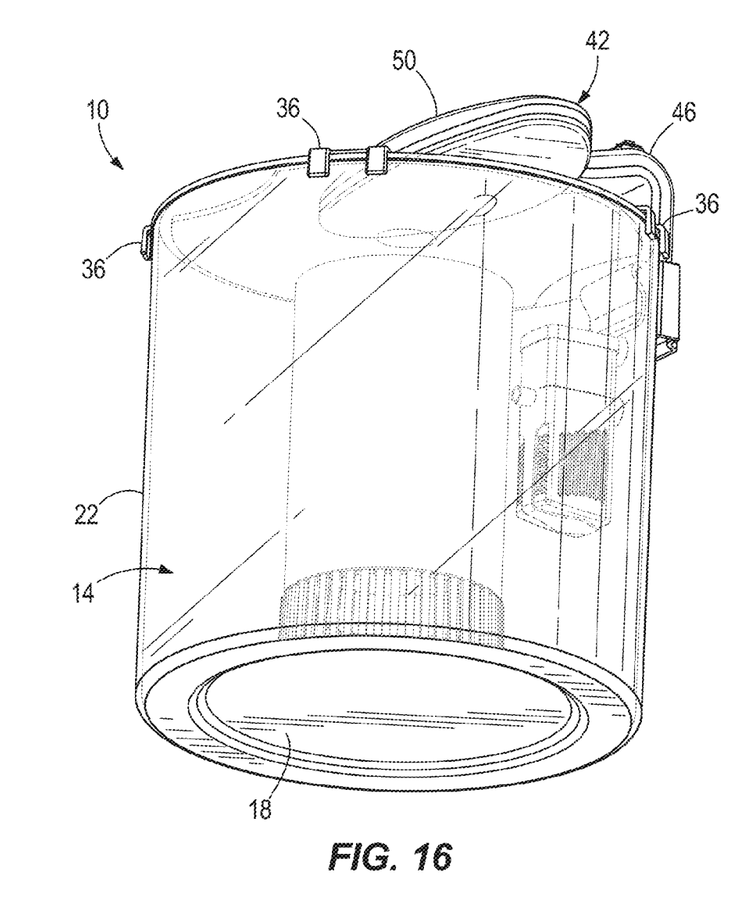
FIG. 16 is a bottom perspective view of the aquarium of FIG. 15.
Figure 17:
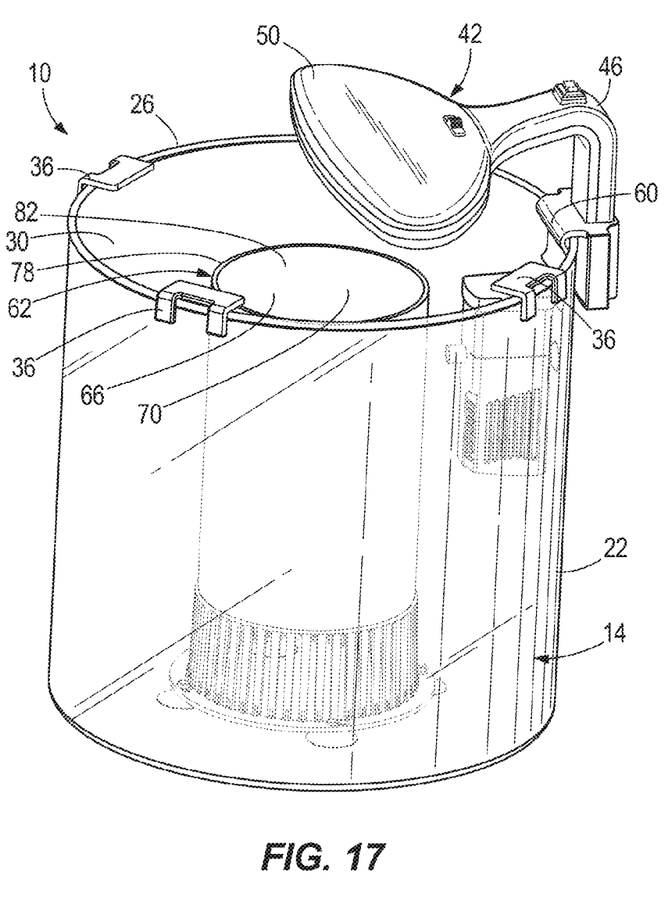
FIG. 17 is a perspective view of the aquarium of FIG. 15, with a top panel removed.

The aquarium 10 also includes a top panel 34 (FIGS. 1, 8, and 15) that is coupled to the rim 26. In some constructions (FIGS. 15-17) one or more clips 36 are provided to couple the top panel 34 to the rim 26. The top panel 34 is a flat, transparent panel (e.g., glass or plastic) that permits viewing of water, aquatic animals, plants, coral, and/or décor within the outer housing 14. In other constructions the top panel 34 is only partially transparent, and/or includes at least one portion that is not flat (e.g., a generally rounded or raised portion). As illustrated in FIGS. 1, 8, and 15, the top panel 34 includes two notches 38 on opposite sides of the panel 34 that form openings to provide access into the interior volume 30. The two notches 38 permit the addition and removal of water and food from the aquarium 10.

With reference to FIGS. 1-5, 8-12, and 15-19, the aquarium 10 also includes a lighting system 42 that is coupled to the outer housing 14. The lighting system 42 includes an arm 46 that is coupled to the side wall 22 and extends over the panel 34, and a light element 50 with one or more LEDs that is coupled to the arm 46 and that directs light in a downward direction through the panel 34 and into the interior volume 30. In some constructions the lighting system 42 is powered by an electrical cord 54 (FIGS. 1, 3-5, and 8-12). In other constructions the lighting system 42 is powered by a battery or batteries, or other power sources. The lighting system 42 illuminates the water, fish, plants, coral, and/or décor within the aquarium 10, as well as provides sustenance in some constructions to one or more plants or coral in the aquarium 10. With reference to FIGS. 1-5 and 8-12, in some constructions the light element 50 is generally circular. With references to FIGS. 15-19, in some constructions the light element 50 has a crescent or generally half-circle shape. Other constructions include different shapes. In some constructions the lighting system 42 is a track lighting system where the light element 50 includes one or more removable light-emitting modules such as the modules 50, 54, 250, 254, and 350 described and illustrated throughout U.S. Patent No. 2014/0226325, the entire contents of which is incorporated herein by reference.

With reference to FIGS. 3-5, 8, 10-12, 18, and 19 the aquarium 10 includes a filter 58. In the constructions illustrated in FIGS. 3-5, 8, and 10-12, the filter 58 is coupled to or integrally formed with the arm 46 (e.g., sits or nests within a portion of the arm 46). In the construction illustrated in FIGS. 18 and 19, the arm 46 and the filter 58 are separate elements. The arm 46 is releasably coupled to the rim 26 with a clip 60, and the filter 58 is releasably coupled to the side wall 22 (and/or to the clip 60) with suction pads 61. In some constructions the filter 58 includes a pump (not shown) powered for example by the electrical cord 54 or by its own separate electrical cord or battery. The pump moves water through a filter element (not shown) within the filter 58 to clean the water. The filter 58 is disposed within the interior volume 30, adjacent and below the rim 26. The filter 58 is exposed directly to the water within the aquarium 10. As illustrated in FIGS. 1, 8, and 15, one of the notches 38 on the top panel 34 provides an opening for insertion and removal of the filter 58. In some constructions the filter 58 operates as a filtration system for filtering the entire volume of water held within the aquarium 10.

Figure 10:
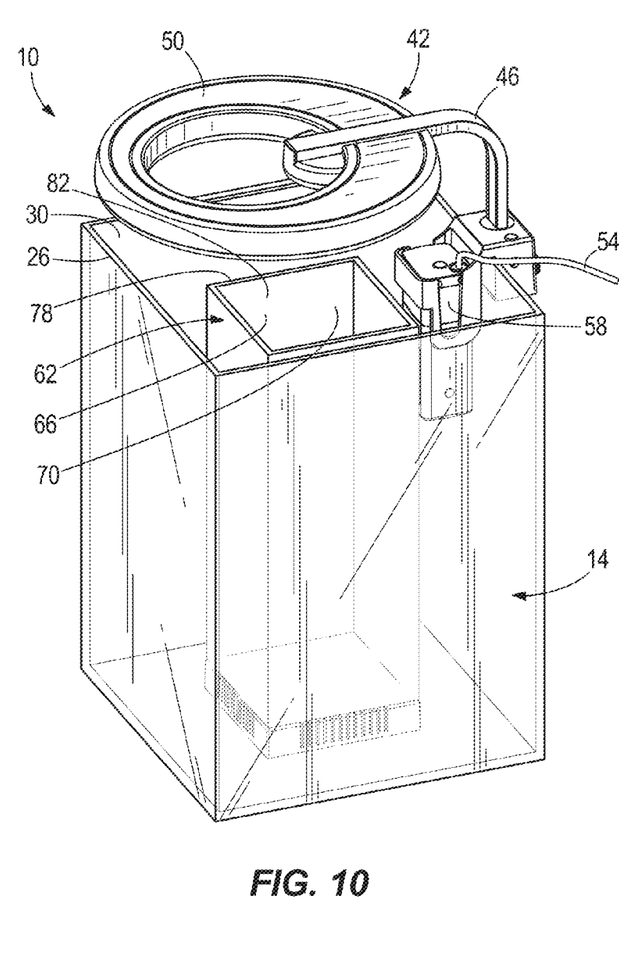
FIG. 10 is a perspective view of the aquarium of FIG. 8, with a top panel removed.
Figure 11:
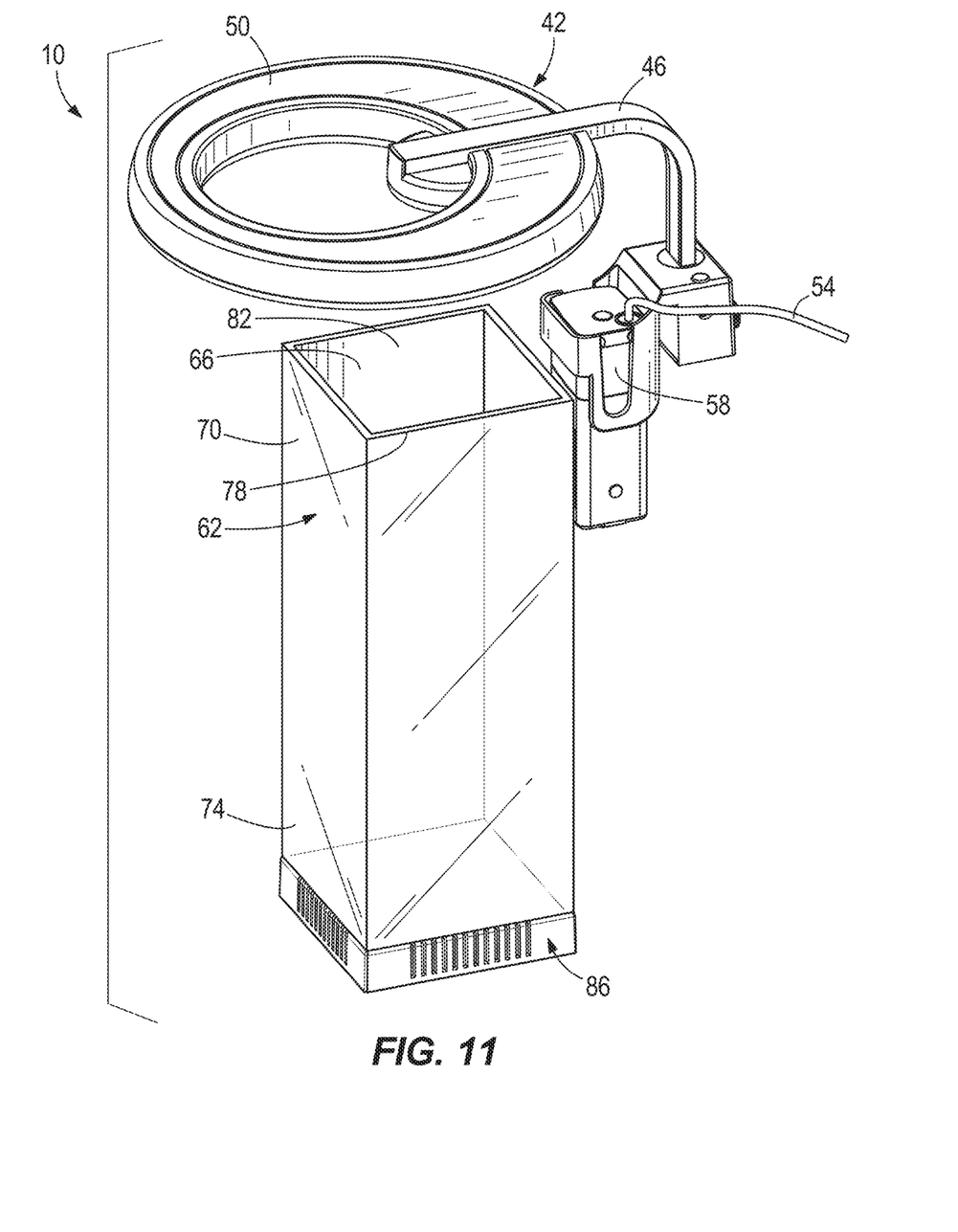
FIG. 11 is a perspective view of the aquarium of FIG. 8, with both the top panel and outer housing removed.
Figure 12:
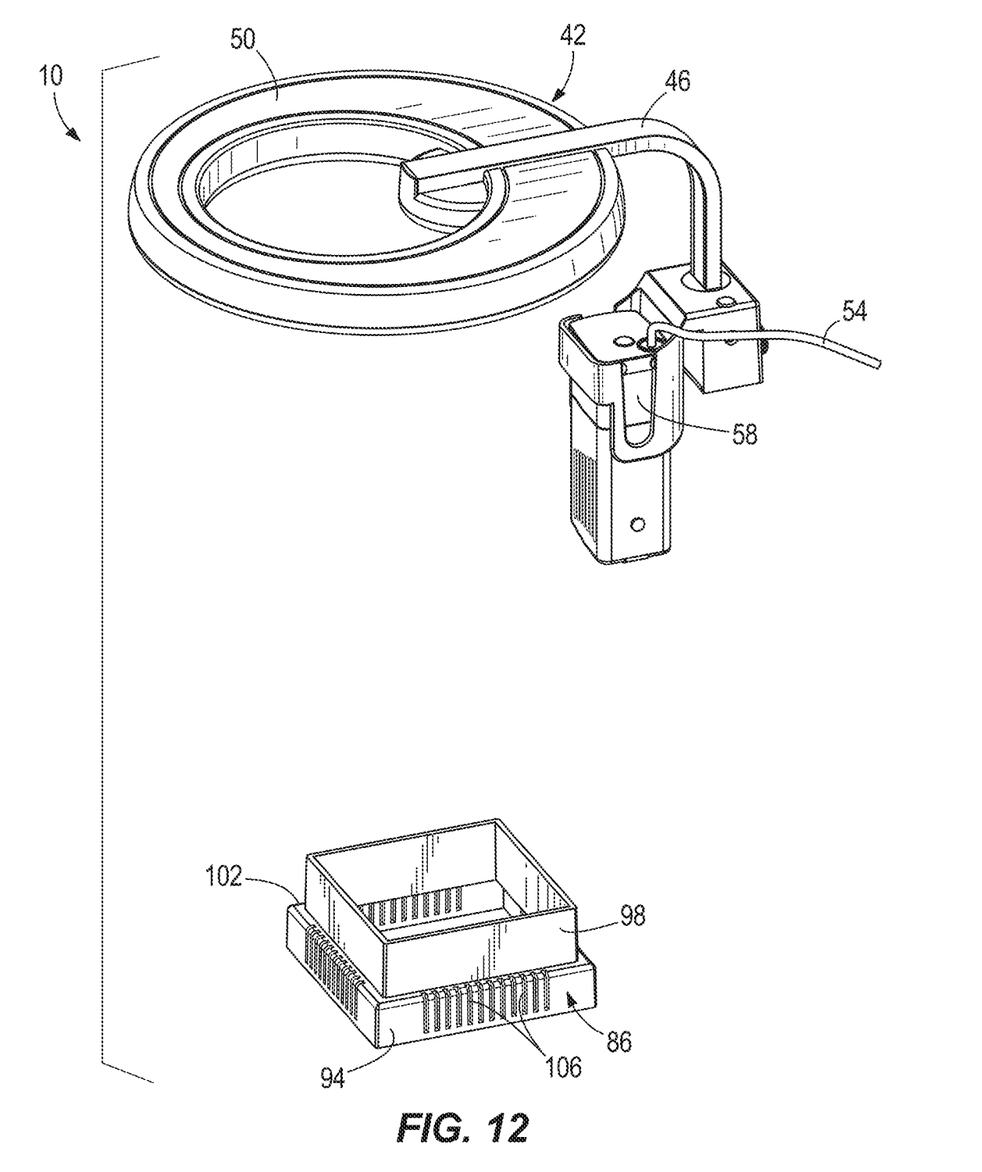
FIG. 12 is a perspective view of the aquarium of FIG. 8, with the top panel, outer housing, and inner housing removed.
Figure 13:
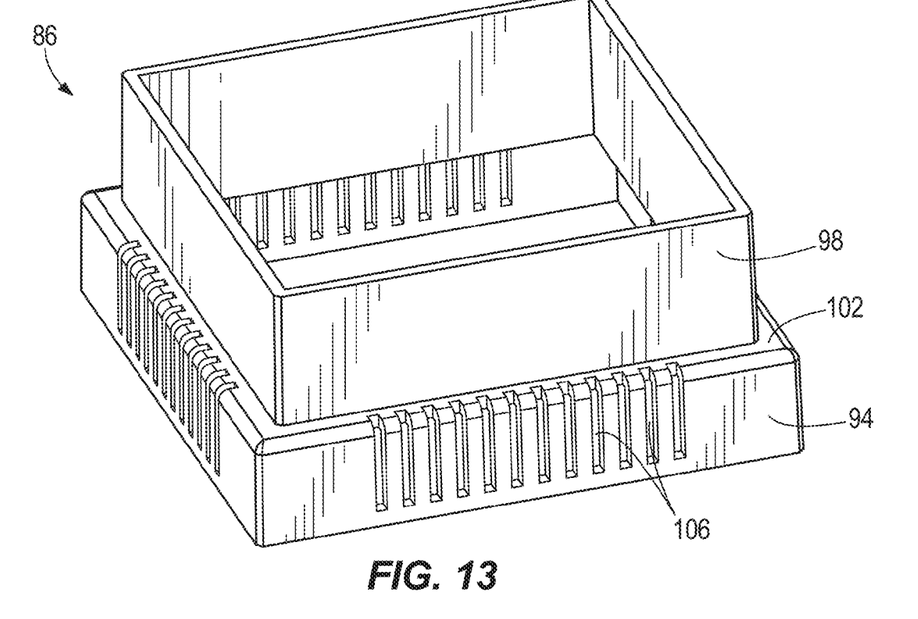
FIG. 13 is a top perspective view of a base for holding the inner housing of the aquarium of FIG. 8.

With reference to FIGS. 3, 4, 10, 11, 17, and 18, the aquarium 10 also includes an inner housing 62 that is disposed within the outer housing 14. In some constructions the inner housing 62 is cylindrical (FIGS. 3, 4, 17, and 18), whereas in other constructions the inner housing is rectangular (FIGS. 10 and 11). Other constructions include different shapes. The inner housing 62 is transparent (e.g., made of glass or plastic) and defines a second interior volume 66 separate from the first interior volume 30. The second interior volume 66 is sized to hold water, aquatic animals, plants, coral, and/or décor.

The inner housing 62 includes a top end 70 and a bottom end 74. The top end 70 includes a rim 78 that defines an opening 82. In the illustrated constructions the rim 78 and opening 82 are disposed below the top panel 34, such that a space or gap exists between the rim 78 and the top panel 34 through which water may enter or leave the opening 82 of the inner housing 62 (e.g., overflowing into or out of the inner housing 62). In other constructions the rim 78 contacts the top panel 34, and/or the inner housing 62 does not include the opening 82, such that water is unable to enter or leave the inner housing 62 through the top end 70. During use, in some constructions the water level within the aquarium is maintained at or below the rim 78, so that any fish or other aquatic animals are unable to move between the inner and outer housings 62, 14 through the top end 70.

With reference to FIGS. 4-7, 11-14, and 18-21, the aquarium 10 also includes a base 86 that is supported by the bottom wall 18 of the outer housing 14, and is attached to the inner housing 62, to provide support for the inner housing 62. In the construction illustrated in FIGS. 6 and 7, the base 86 is coupled to the bottom wall 18 through use of fasteners (not shown) that extend through apertures 90 and into the bottom wall 18. In the construction illustrated in FIGS. 18-21, the base 86 is coupled to the bottom wall 18 with suction pads 92. In other constructions the base 86 is coupled to the bottom wall 18 with adhesive or other materials or structures. In some constructions the base 86 is releasably coupled to the bottom wall 18, so that the aquarium 10 may be used without the base 86 and/or inner housing 62.

Figure 4:
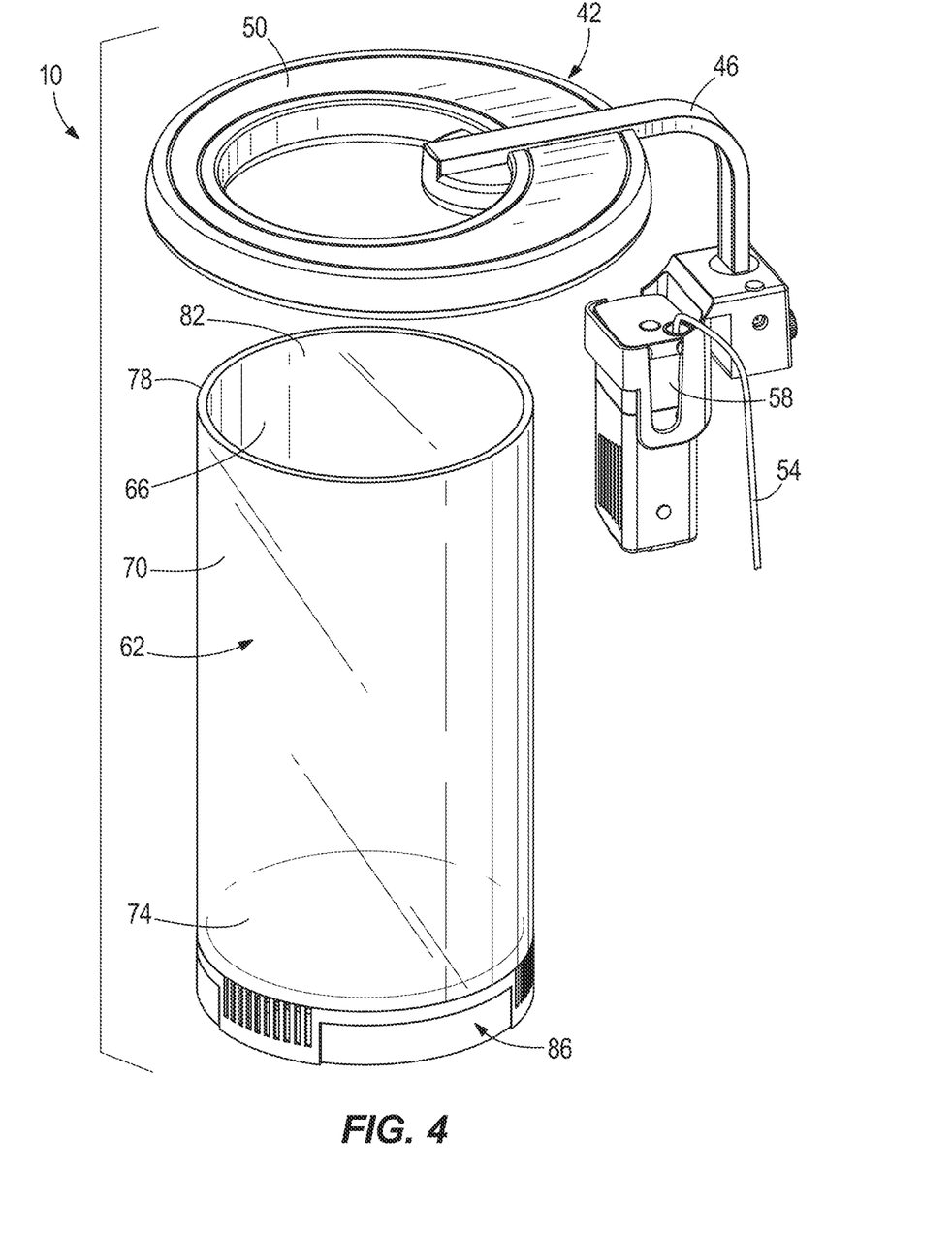
FIG. 4 is a perspective view of the aquarium, with both the top panel and outer housing removed.
Figure 5:
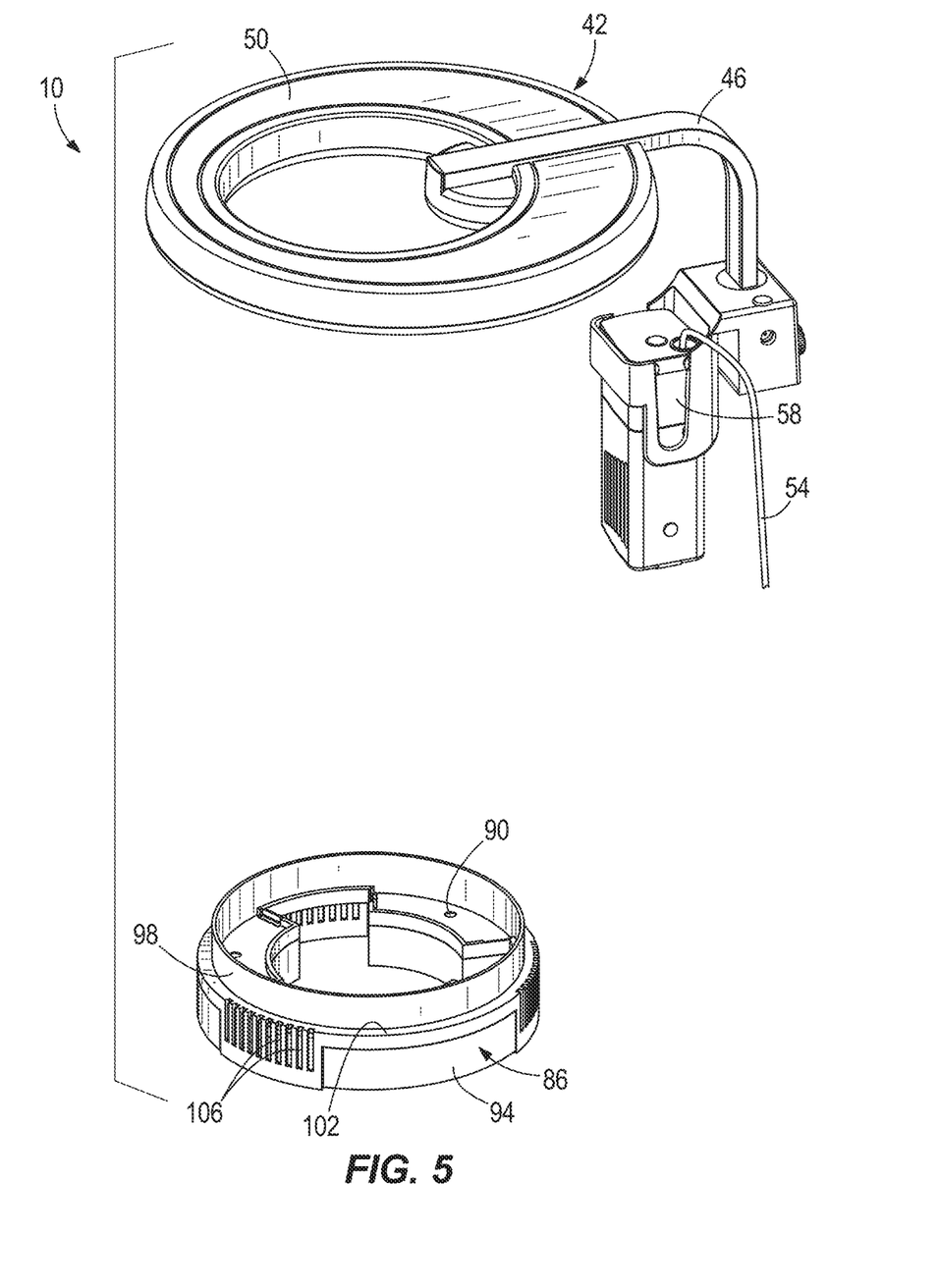
FIG. 5 is a perspective view of the aquarium, with the top panel, outer housing, and inner housing removed.
Figure 18:
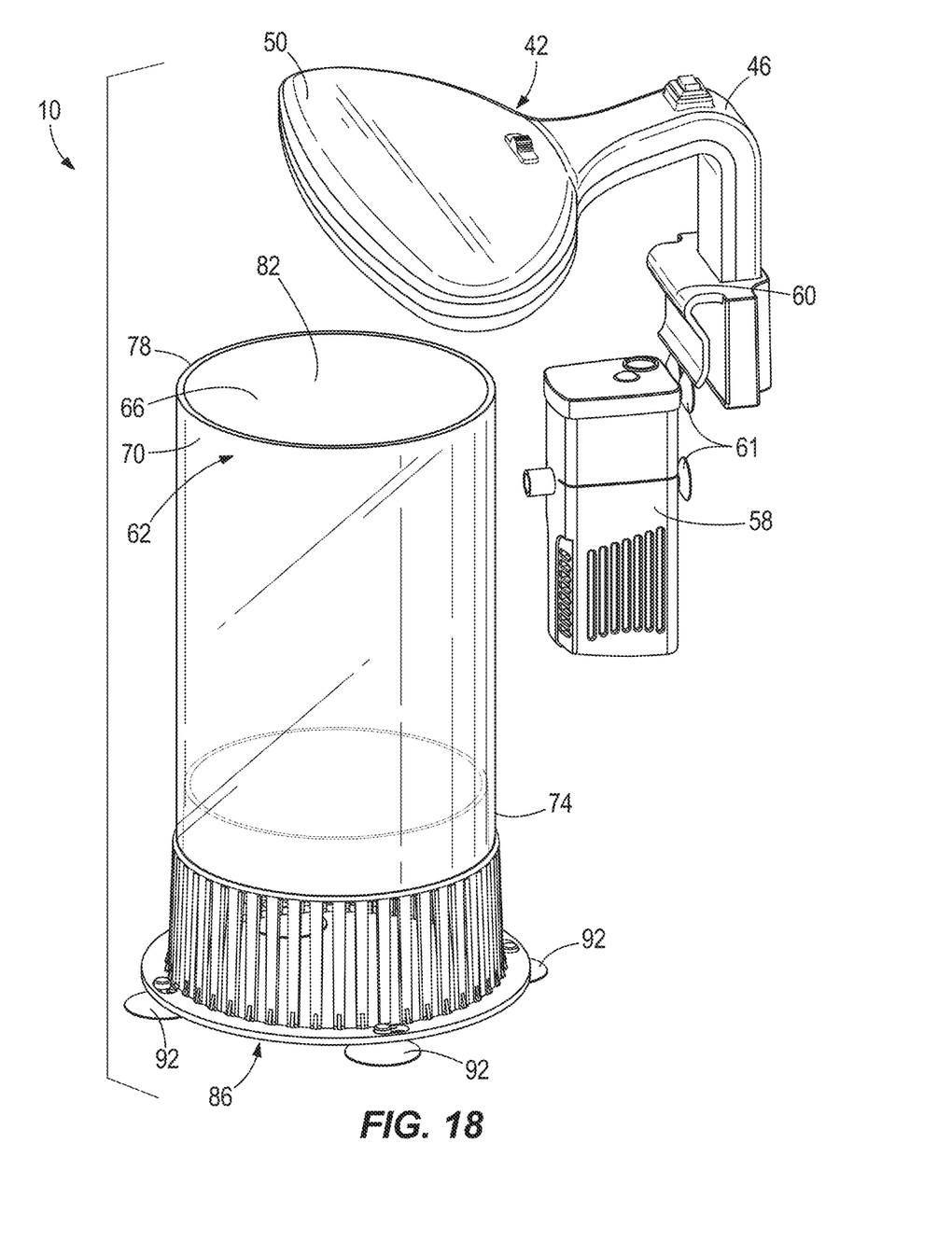
FIG. 18 is a perspective view of the aquarium of FIG. 15, with both the top panel and outer housing removed.
Figure 19:
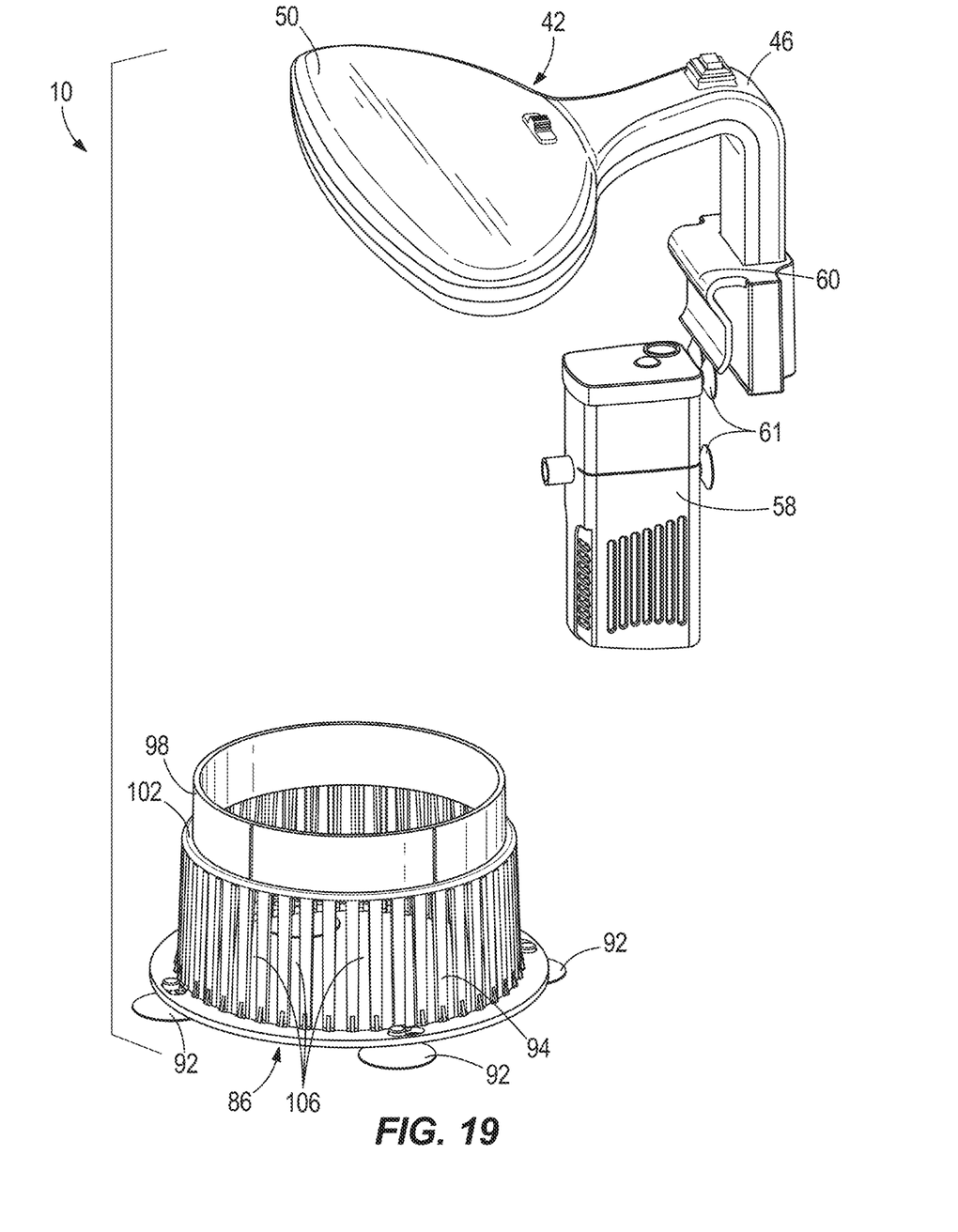
FIG. 19 is a perspective view of the aquarium of FIG. 15, with the top panel, outer housing, and inner housing removed.
Figure 20:
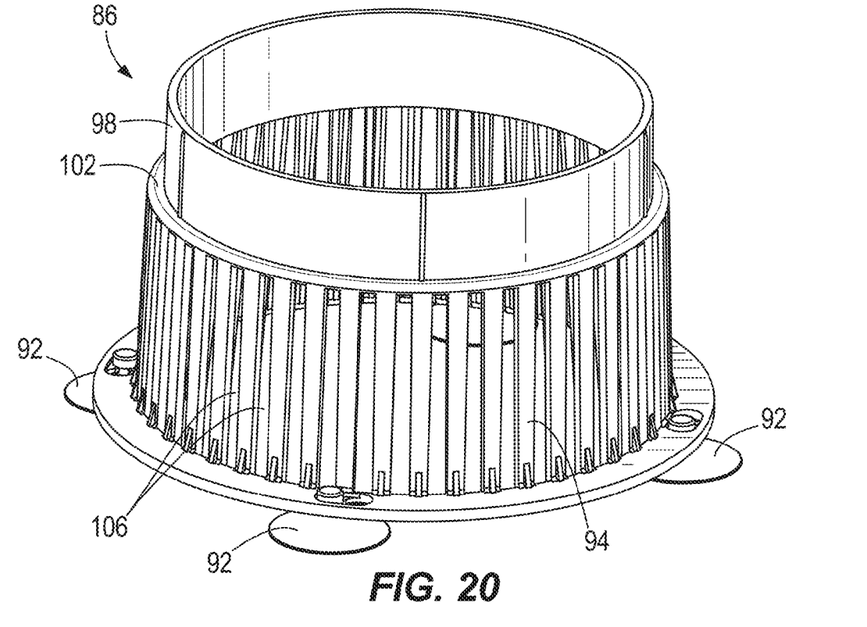
FIG. 20 is a top perspective view of a base for holding the inner housing of the aquarium of FIG. 15.

With continued reference to FIGS. 4-7, 11-14, and 18-21, the base 86 includes a lower portion 94, an upper portion 98 extending from the lower portion 94, and a ledge 102 disposed between the lower and upper portions 94, 98. The inner housing 62 is coupled to the base 86 by sliding the bottom end 74 of the inner housing 62 over the upper portion 98 of the base 86 and resting the bottom end 74 of the inner housing 62 on the ledge 102 (FIGS. 4, 11, and 18). In the illustrated constructions the diameter (or cross-sectional area for the construction in FIGS. 8-14) of the lower end 74 of the inner housing 62 is only slightly larger than a diameter or cross-sectional area of the upper portion 98 of the base 86, such that the inner housing 62 is held frictionally in place over the upper portion 98 of the base 86, but may easily be removed from the base 86 if desired. In some constructions the base 86 is formed integrally as a single piece with the inner housing 62, and is part of the inner housing 62.

Figure 6:
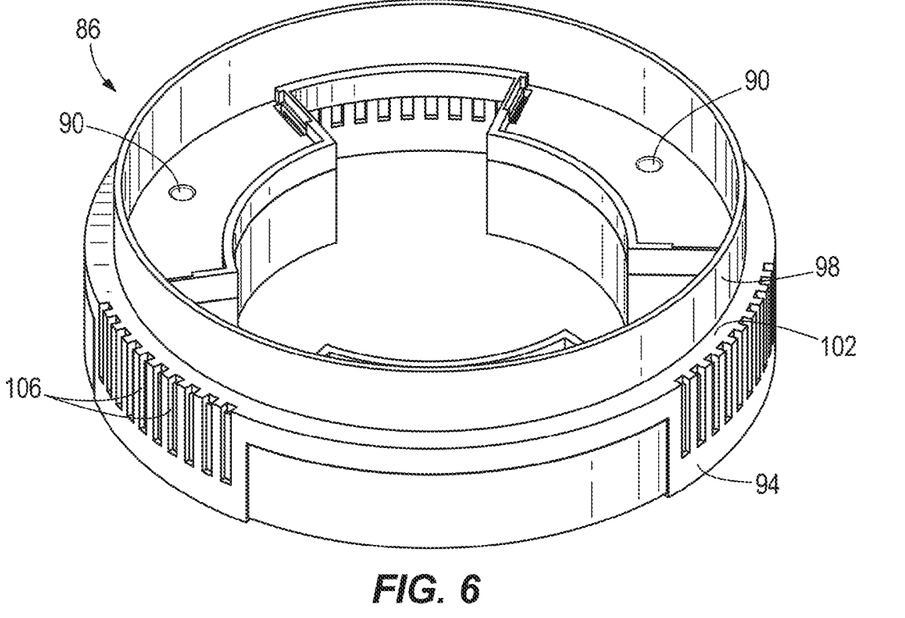
FIG. 6 is a top perspective view of a base for holding the inner housing.
Figure 7:
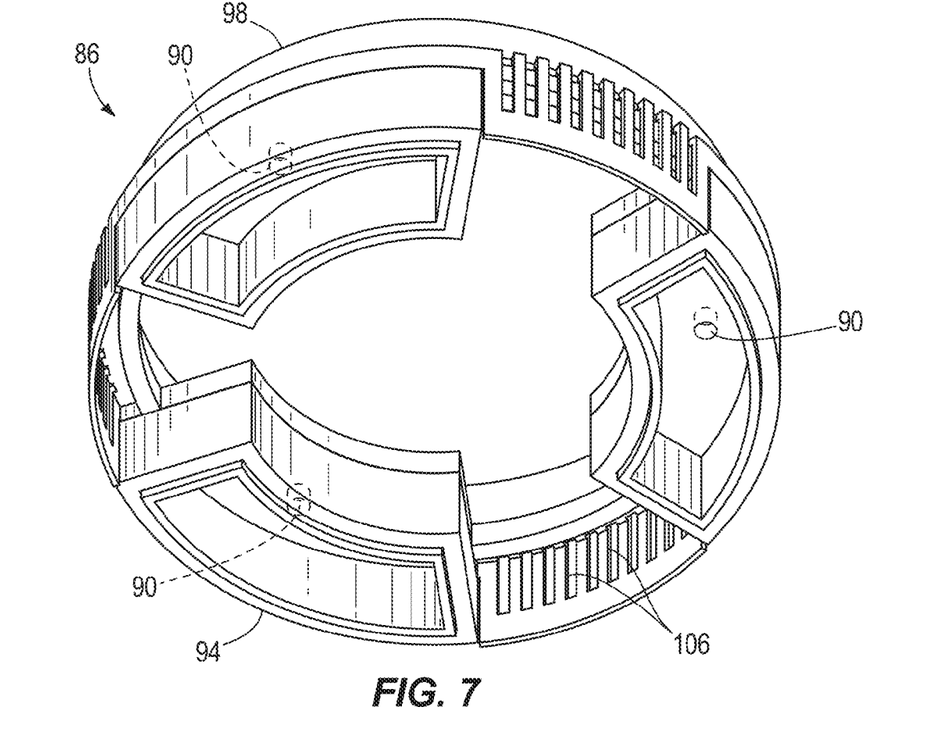
FIG. 7 is a bottom perspective view of the base.
Figure 14:
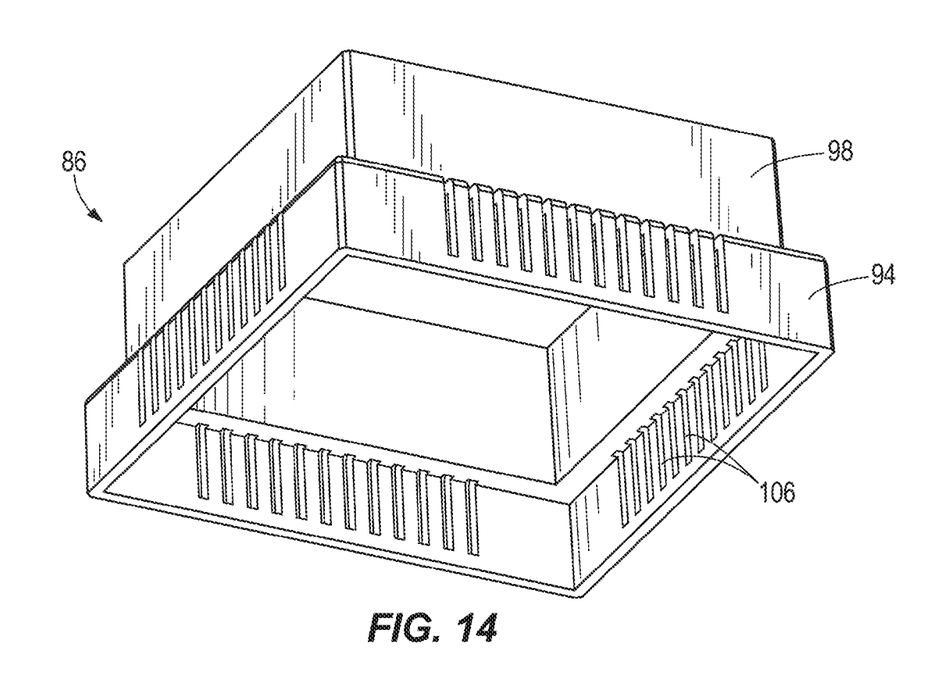
FIG. 14 is a bottom perspective view of the base for holding the inner housing of the aquarium of FIG. 8.
Figure 21:
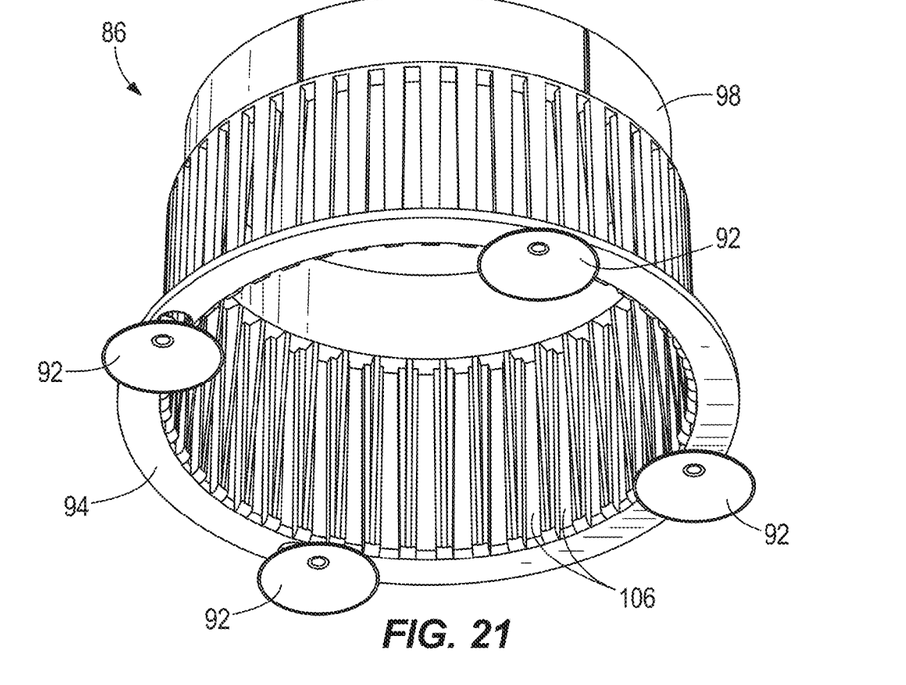
FIG. 21 is a bottom perspective view of the base for holding the inner housing of the aquarium of FIG. 15.

With reference to FIGS. 5-7, 12-14, and 19-21, the base 86 also includes a plurality of apertures 106 disposed on the lower portion 94 of the base 86. In the illustrated constructions the apertures 106 are elongate slots that extend vertically, along generally the same direction as the inner housing 62. The apertures 106 are disposed at locations around the lower portion 94. For example, as illustrated in FIG. 6, in some constructions the apertures 106 are disposed in three groups spaced equally around the lower portion 94. As illustrated in FIG. 14, in some constructions the apertures 106 are disposed in four groups spaced equally around the lower portion 94. As illustrated in FIG. 21, in some constructions the apertures 106 are disposed entirely around the lower portion 94. Other constructions include different numbers, sizes, shapes, and locations for the apertures 106 than that illustrated.

The apertures 106 permit exchange of water between the second interior volume 66 of the inner housing 62 and the first interior volume 30 of the outer housing 14, and maintain consistency within the water in both interior volumes 66, 30 (e.g., with natural diffusion principles that keep chemical water concentrations of contaminants such as Nitrate, Nitrite, and Ammonia equal in both interior volumes 66, 30). In some constructions a heating element is included (e.g., coupled to an inside of the outer housing 14) that heats water in the first interior volume 30. The apertures 106 facilitate water temperature equilibrium, by allowing warmed water to pass into the second interior volume 66, and cooler water to pass out of the apertures 106 into the first interior volume 30. A Betta disposed and confined in the inner housing 62 can thus benefit from the heated water.

In use, the outer housing 14 is positioned in a desired location and the base 86 and inner housing 62 are attached or otherwise positioned therein. Any desired bottom décor (e.g., rocks, coral, plants, glass beads, etc.) is then placed in the outer housing 14. Water is then placed in the outer housing 14. The water also flows into the inner housing 62 via the apertures 106 in the base 86. During use, the water freely flows between the annular space defined between the outer housing 14 and the inner housing 62 (i.e., the interior volume 30) and the space within the inner housing 62 (i.e., the interior volume 66). The user then places any animals into the two available spaces. The sharing of water between the spaces allows for the use of a single filtration system and a single aeration system for both spaces. In addition, by separating the spaces, the user can now place animals that may not necessarily be compatible into a single aquarium without fear of the animals mingling in an unwanted manner. For example, territorial animals (e.g., Betta fish) are typically placed with only a single animal in each aquarium. The aquarium 10 illustrated herein allows a user to place two territorial animals in the same aquarium 10 while maintaining a physical separation between the animals.

Although the invention has been described in detail with reference to certain preferred embodiments, variations and modifications exist within the scope and spirit of one or more independent aspects of the invention as described.

What is claimed is:

1. An aquarium comprising:
    an outer housing including a bottom wall and a side wall extending from the bottom wall, the outer housing defining a first interior tank volume to house water;
    a base disposed inside the first interior volume and coupled to the bottom wall, the base including an aperture;
    an inner housing coupled to the base, the inner housing defining a second interior tank volume to house water, wherein the aperture provides fluid communication between the first and second interior tank volumes; and
    a lighting system coupled to the outer housing that directs light into the first and second interior tank volumes.

2. The aquarium of claim 1, wherein the base includes an upper portion, a lower portion, and a ledge disposed between the upper and lower portions.

3. The aquarium of claim 2, wherein the inner housing includes a bottom end that slides over the upper portion and rests on the ledge when the inner housing is coupled to the base.

4. The aquarium of claim 2, wherein the aperture is disposed in the lower portion of the base.

5. The aquarium of claim 2, wherein the base includes a plurality of suction pads coupled to the lower portion, and wherein the suction pads couple the base to the bottom wall of the outer housing.

6. The aquarium of claim 1, further comprising a top panel coupled to the outer housing, the top panel including a notch that defines an opening to insert food and water into the first interior volume.

7. The aquarium of claim 6, further comprising a clip that couples the top panel to the outer housing.

8. The aquarium of claim 1, wherein the lighting system includes an arm coupled to the outer housing and light element disposed at an end of the arm.

9. The aquarium of claim 8, wherein outer housing includes a rim, and wherein the arm is coupled to the rim of the outer housing with a clip.

10. The aquarium of claim 1, further comprising a filter coupled to the outer housing and disposed within the first interior tank volume.

11. The aquarium of claim 10, wherein the filter includes suction pads that are coupled to the side wall.

12. The aquarium of claim 1, wherein the inner and outer housings are both cylindrical, transparent housings.

13. An aquarium comprising:
    an outer housing defining a tank volume to house water;
    an inner housing disposed within the outer housing and dividing the tank volume into an inner volume and an outer volume, the outer volume disposed between the outer housing and the inner housing;
    a filter coupled to the outer housing, the filter operable to filter all of the water within both the inner volume and the outer volume; and
    a lighting system coupled to the outer housing that directs light into the tank volume.

14. The aquarium of claim 13, wherein the inner volume defines a first habitat for a first animal and the outer volume defines a second habitat for a second animal, and wherein the inner housing physically separates the first habitat from the second habitat.

15. The aquarium of claim 13, wherein the lighting system includes an arm coupled to the outer housing and an light element disposed at an end of the arm.

16. The aquarium of claim 15, wherein inner housing includes a base portion having an aperture to permit exchange of water between the inner and outer housings.

17. The aquarium of claim 13, wherein the filtration system includes suction pads that are coupled to the outer housing.

18. The aquarium of claim 13, further comprising a top panel coupled to the outer housing, the top panel including a notch that defines an opening to insert food and water into the tank volume.

19. An aquarium comprising:
    an outer housing including a bottom wall and a side wall extending from the bottom wall, the outer housing defining a first interior tank volume to house water;
    a base disposed inside the first interior volume and coupled to the bottom wall, the base including an aperture;
    an inner housing coupled to the base, the inner housing defining a second interior tank volume to house water, wherein the aperture provides fluid communication between the first and second interior tank volumes; and
    a top panel coupled to the outer housing, the top panel including a notch that defines an opening to insert food and water into the first interior volume.

20. An aquarium comprising:
    an outer housing defining a tank volume to house water;
    an inner housing disposed within the outer housing and dividing the tank volume into an inner volume and an outer volume, the outer volume disposed between the outer housing and the inner housing;
    a filter coupled to the outer housing, the filter operable to filter all of the water within both the inner volume and the outer volume; and
    a top panel coupled to the outer housing, the top panel including a notch that defines an opening to insert food and water into the tank volume.

* * * * *